US007270025B2

(12) United States Patent
Niglöv

(10) Patent No.: US 7,270,025 B2
(45) Date of Patent: Sep. 18, 2007

(54) ADJUSTING DEVICE FOR REGULATING THE ECCENTRIC MOMENT OF A ROLLER DRUM ECCENTRIC SHAFT

(75) Inventor: Nils-Göran Niglöv, Lyckeby (SE)

(73) Assignee: Metso Dynapac AB, Karlskrona (SE)

( * ) Notice: Subject to any disclaimer, the term of this patent is extended or adjusted under 35 U.S.C. 154(b) by 674 days.

(21) Appl. No.: 10/805,196

(22) Filed: Mar. 22, 2004

(65) Prior Publication Data

US 2004/0182185 A1 Sep. 23, 2004

(30) Foreign Application Priority Data

Mar. 21, 2003 (SE) .................................... 0300756

(51) Int. Cl.
*F16H 33/10* (2006.01)

(52) U.S. Cl. .................................... 74/86; 74/87; 74/61

(58) Field of Classification Search .................... 74/86, 74/87, 61, 22 R
See application file for complete search history.

(56) References Cited

U.S. PATENT DOCUMENTS 3,192,839 A 7/1965 Vivier
3,670,631 A * 6/1972 Gaylor ........................ 404/117
4,481,835 A 11/1984 Storm
4,561,319 A * 12/1985 Lilja ............................ 74/61
4,568,218 A 2/1986 Orzal
6,585,450 B2 * 7/2003 Meyers et al. .............. 404/117
7,117,758 B2 * 10/2006 Riedl ............................ 74/87
7,171,866 B2 * 2/2007 Fervers et al. ................ 74/87

FOREIGN PATENT DOCUMENTS

| | | |
|---|---|---|
| AT | 375845 | 9/1984 |
| EP | 0 987 371 | 3/2000 |
| GB | 2 159 236 | 11/1985 |
| WO | WO 00/05455 | 2/2000 |

* cited by examiner

*Primary Examiner*—David M. Fenstermacher
(74) *Attorney, Agent, or Firm*—Walter Ottesen

(57) ABSTRACT

An adjusting device (11) is for regulating the eccentric moment of an eccentric shaft (2) of a roller drum (1) through the influence of an axially directed force transmitted by a force transmission mechanism (12) to a turning device (5), in order to cause a rotation of the eccentric shaft (2). The force transmission mechanism (12) is connected to the adjusting device (11). The adjusting device (11) incorporates a driving device (20), a transmission (19), a tube sleeve (17) and a guide screw (14) which is rotatably arranged in a threaded bore (16) in a journalling shaft (15) for the roller drum (1). The driving device (20) is connected to the tube sleeve (17) via a transmission (19) for transmitting a rotary movement to the tube sleeve (17). The guide screw (14) is arranged outside the tube sleeve (17) with a spline joint (18) whereby the guide screw (14) is displaced axially when the tube sleeve (17) is rotated and consequently transmits an axial movement to the force transmission mechanism (12) which is connected to the guide screw (14) via a bearing assembly.

7 Claims, 3 Drawing Sheets

ADJUSTING DEVICE FOR REGULATING THE ECCENTRIC MOMENT OF A ROLLER DRUM ECCENTRIC SHAFT

CROSS REFERENCE TO RELATED APPLICATION

This application claims priority of Swedish patent application no. 0300756-4, filed Mar. 21, 2003, the entire content of which is incorporated herein by reference.

FIELD OF THE INVENTION

This invention relates to a device for regulating the eccentric moment of a roller drum eccentric shaft for the purpose of influencing the vibration amplitude of the roller drum. The device is particularly suitable for rollers used for the vibration packing of unbound and bound layers of soil, stone, gravel, clay, macadam and asphalt.

BACKGROUND OF THE INVENTION

In the construction of roads, grades and dams, the filling masses or base courses are packed to a suitable density and carrying capacity. If the compacted surface is to be asphalted, the laid asphalt must also be compacted. In this type of compacting work it is appropriate to use rollers which are equipped with one or more vibrating drums. The compacting work supplied during one pass with a roller of a certain weight class and vibrating mass depends largely on the amplitude with which the drum is vibrated and the frequency at which the vibrations occur. In compacting work using such vibrating rollers, it has been shown to be advantageous to control the amount of compacting work supplied by regulating the vibration amplitude of the drum at a fixed frequency. During the first few passes, applying the maximum vibration amplitude is recommended, and during the final passes, when the subgrade begins to become finish-compacted, a lower amplitude is applied. If the hard subgrade that is almost finish-compacted is vibrated at too high an amplitude, the roller tends to "bounce" which adversely affects its mechanics and may also give rise to undesirable loosening of the surface layer. If the almost finished packed subgrade consists of asphalt, there is a risk that the constituents of the asphalt will be crushed, thereby reducing the quality of the asphalt covering.

These are some of the reasons why roller manufacturers want to equip their rollers with drums in which the vibration amplitude can be varied by influencing the eccentric shafts of the drums. The most common method is to fit the rollers with eccentric shafts the eccentric moment of which can be varied. The eccentric moment refers to the product of the unbalanced mass of the eccentric shaft and distance of the center of gravity thereof from the center of rotation of the shaft. The variable eccentric shafts are often based on two tubes arranged coaxially and fitted with eccentric weights which can be turned relative to each other by means of the turning devices on the eccentric shaft. When the weights balance each other out, this enables a minimum eccentric moment to be obtained and when the weights interact, a maximum eccentric moment can be obtained. The turning device is actuated by axial regulating forces which are transformed by the turning device into turning movements.

In order to generate axial regulating forces, an apparatus is required comprising an adjusting device and a force transmission mechanism. The adjusting device, in which the axial regulating forces are generated, is located outside one of the drum heads. The function of the force transmission mechanism is to conduct the regulating forces to the turning device located inside the drum. This invention relates to such an apparatus.

The adjustable eccentric shafts described in Austrian patent publication 375,845 and Swedish patent publication 514,877 disclose the adjustable eccentric shaft described above. In Austrian patent publication 375,845, an eccentric shaft with turnable eccentric weights, actuated by a turning device, is described. The turning device and the adjusting device are arranged at a certain distance from each other and are connected by a rod. The rod may be said to constitute the aforementioned force transmission mechanism, except that one of its ends constitutes the piston in a single-acting hydraulic adjusting device with which the axial regulating force is generated. The restoring force is generated by a helical spring.

In practical tests, the applicant has noticed that minor, commonly occurring variations in hydraulic pressure give rise to considerable variations in regulating force on this type of hydraulic adjusting device. The result is unacceptable variations in the vibration amplitude. Moreover, providing space for a sufficiently strong helical spring is too complicated within the available area. There is also a problem in finding a reliable method of reading the instantaneous position of the hydraulic adjusting device in the regulating range. The force transmission mechanism (rod) of the eccentric shaft of the prior art runs coaxially through the drive shaft center of the eccentric shaft. As a result of this, the hydraulic pressure must be supplied in a complicated manner to the actuating device via the drive unit of the eccentric shaft.

The adjustable eccentric shaft disclosed in Swedish patent publication 514,877 shows, in several embodiments, how the hydraulic pressure can be supplied by simpler means. In this eccentric shaft, the drive shaft is arranged in the center of a hydraulic adjusting device and the force transmission mechanism comprises two or more actuating rods which are located parallel and symmetrically around the center of the eccentric shaft. One of the embodiments shows how the necessity for the helical spring can be eliminated by making the hydraulic adjusting device double-acting.

However, the aforementioned problems relating to variations in hydraulic pressure and position determination are not solved in these embodiments. One of the embodiments in Swedish patent publication 514,877 shows how the problem of variable hydraulic pressure can be solved by changing to a mechanical adjusting device. The mechanical adjusting device is based on a worm gear and actuates a force transmission mechanism comprising only one actuating rod. The drive shaft of the eccentric shaft runs through the center of the adjusting device and has been provided with axial slots for operating the adjusting device. The applicant has gained practical experience of the drive shafts of eccentric shafts being subjected to extremely high fatigue stresses. Stress concentrations, which may very well lead to fatigue failure, occur around an axial slot of this type.

According to the applicant, a freestanding drive shaft without grooves for the operation of the adjusting device is preferable for this reason.

Another problem that requires unconventional mechanical solutions is the perpendicular orientation and position of the worm gear relative to the eccentric shaft. The space for the adjusting motor of the adjusting device in this direction is very limited in a roller drum, while, at the same time, the required connecting flange of the adjusting motor tends to collide with the connecting flange for the eccentric shaft drive motor. It is more advantageous to arrange the adjusting motor in parallel with the drive motor.

SUMMARY OF THE INVENTION

It is an object of the invention to provide an adjusting apparatus which solves the problems associated with the prior art combination of mechanical adjusting devices and force transmission mechanisms using only one actuating rod. According to the invention, the components of the mechanical adjusting device are designed so that they can actuate a force transmission mechanism which comprises two or more actuating rods.

Although Swedish patent application 514,877 (corresponding to international patent application PCT/SE 99/01257, filed Jul. 12, 1999, and incorporated herein by reference) describes how such a force transmission mechanism can be combined with a hydraulic adjusting device, it does not describe how a device with a mechanical adjusting device should be designed to be able to actuate such a force transmission mechanism.

The mechanical adjusting apparatus of the invention is designed so that a freestanding drive shaft for the eccentric shaft is able to run through it. "Freestanding" in this context means that no grooves or other strength-weakening adaptations need be made to the drive shaft for the operation of the adjusting device.

The mechanical adjusting device is designed so that its adjusting motor can be installed in parallel with the eccentric shaft drive motor. The problem of position determination is solved because the instantaneous position in the adjustment range can be determined by a rational, reliable method.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
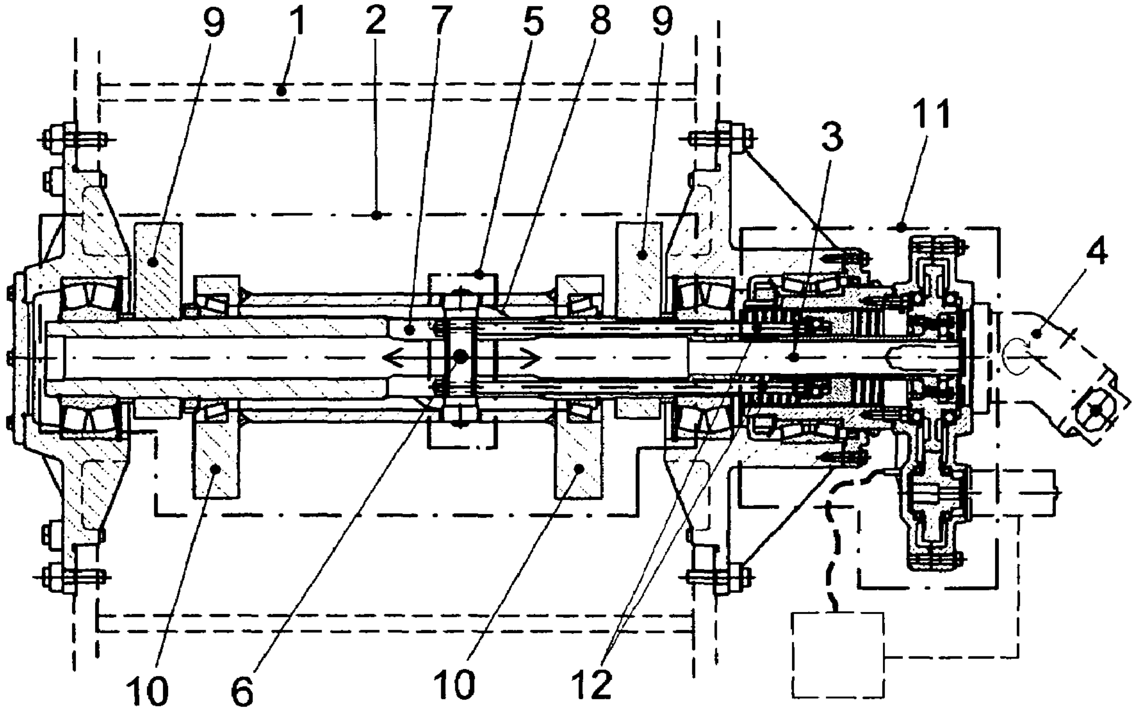
FIG. 1 shows a vertical section of a roller drum with equipment for generating and regulating the vibration amplitude.

FIG. 1 shows a roller drum 1 for a vibration roller. An eccentric shaft 2 with adjustable eccentric moment is mounted at the center of the roller drum. Vibrations are generated as eccentric shaft 2 is rotated by a drive motor 4 via a freestanding drive shaft 3 at a constant speed. The eccentric moment of eccentric shaft 2 can be regulated when it is rotated or stationary by the action of its turning device 5, with axially directed regulating forces 6. The actuation of turning device 5 results in a rotation of eccentric shaft 2. The rotation of the eccentric shaft refers to a functional process in which turning device 5, during its axial displacement resulting from the influence of the axial regulating forces, follows slots 7 and 8 of the inner and outer eccentric shafts, respectively. Outer eccentric shaft slot 8 in the embodiment shown has a spirally-shaped pitch in the axial direction, while the slot 7 in the inner eccentric shaft runs axially. The difference in pitch between the slots and the axial displacement of turning device 5 causes eccentric weight 10 of the outer eccentric shaft to be rotated relative to eccentric weight 9 of the inner eccentric shaft which results in the desired regulation of the eccentric moment of eccentric shaft 2.

The regulating forces are generated according to this invention by a mechanical adjusting device 11 and are transferred to turning device 5 via a force transmission mechanism 12. The connection of force transmission mechanism 12 to turning device 5 is arranged so that it can be influenced by axial regulating forces 6 in different directions.

Figure 2:
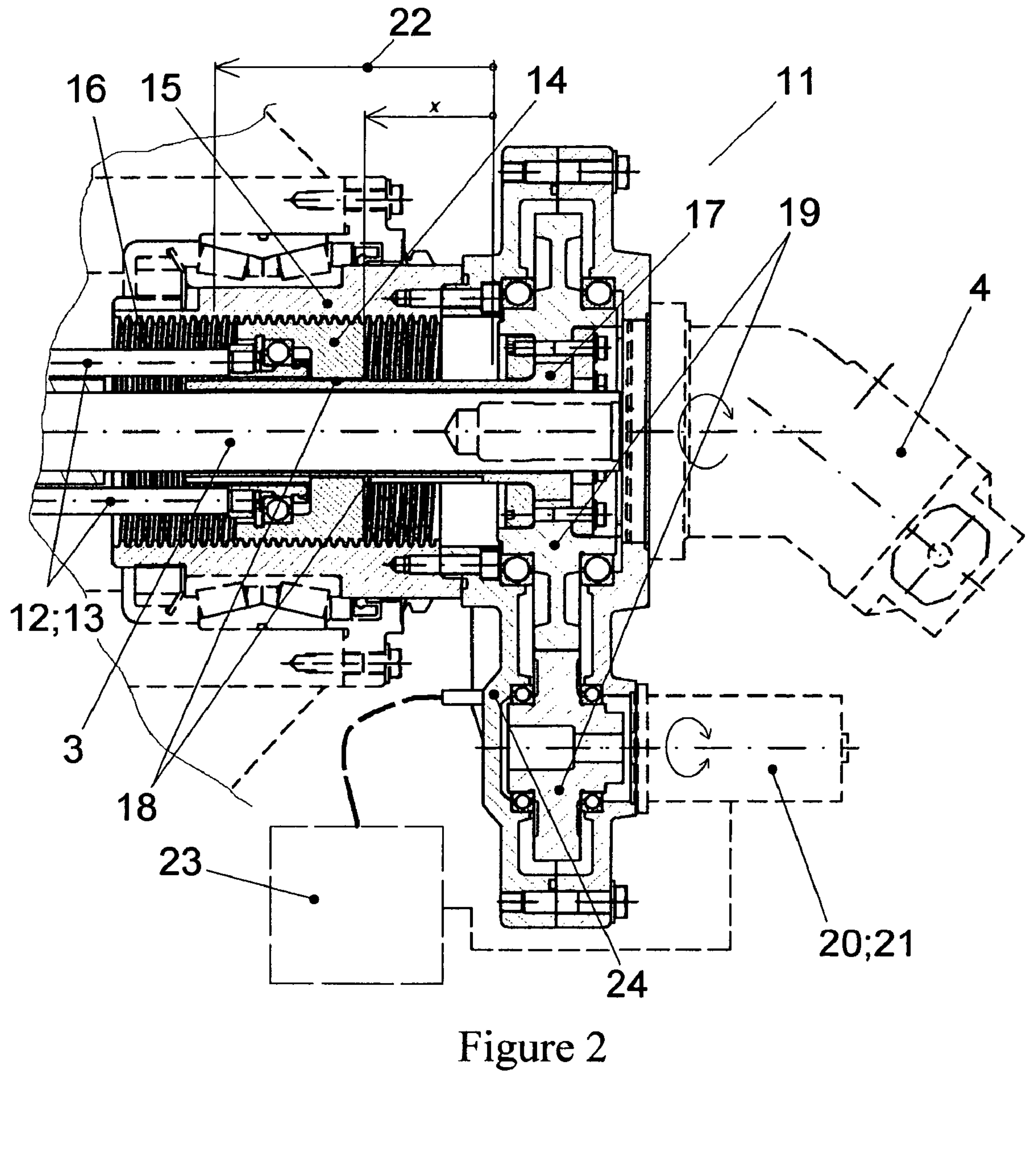
FIG. 2 is an enlarged view of a detail of FIG. 1 and shows an embodiment of an adjusting device according to the invention incorporated in an arrangement for regulating the eccentric moment of the eccentric shaft of a roller drum.

FIG. 2 shows how the two actuating rods 13 of force transmission mechanism 12 are provided with a bearing connection to guide screw 14 of mechanical adjusting device 11. In this embodiment, actuating rods 13 are two in number, but this number may be increased, for example, when large regulating forces are to be transferred and the load must be distributed among more than two rods. Actuating rods 13 are symmetrically arranged in a balanced fashion around the center of eccentric shaft 2, and because of the bearing connection to guide screw 14, they are able to follow the rotation of eccentric shaft 2 relative to adjusting device 11. At the same time, actuating rods 13 are able to transfer axial regulating forces in different directions as indicated by arrows 6. The axial regulating forces are generated when guide screw 14 is subjected to a rotation in threaded bore 16 of journalling shaft 15 which, due to the thread pitch, results in a displacement of guide screw 14 in the axial direction. The threads in threaded bore 16 and on the periphery of guide screw 14 can be advantageously designed as trapezoid threads, but it is also possible to use other types of threads. Guide screw 14 is arranged outside tube sleeve 17 via a spline joint 18, which allows the axial displacement of guide screw 14, while, at the same time, enabling rotary movement to be transmitted. The hub and shaft of spline joint 18 are suitably integrated in the center of guide screw 14 and on the periphery of tube sleeve 17, respectively. The teeth and spaces of spline joint 18 are designed according to a suitable standard for an involute profile. A rule of thumb may be that it is suitable to use eleven teeth for axial regulating forces of ten kilo-newtons. Tube sleeve 17 is connected to and rotated by a transmission 19 which is, in turn, driven by a driving device 20. Since the force distribution on a vibrating roller often takes place hydraulically, a hydraulically driven adjusting motor 21 is preferable as driving device 20, but electrically or pneumatically driven adjusting motors may also be used. It is also possible to allow the driving device to consist of a manually actuated crank.

In the embodiment shown, transmission 19 comprises a straight gear transmission with two gear wheels one of which is connected to driving device 20 and the other to tube sleeve 17. The pitch diameters of the gear wheels are selected so that a suitable reduction ratio and distance between the centers of the gear wheels are achieved. The gear and gear case enable adjusting motor 21 and drive motor 4 to be arranged in parallel because the motor connections in the gear case are orientated so that the motor drive shafts are parallel to each other. It is also possible to use gears with more than two gear wheels to obtain other reduction ratios, parallel distances or directions of rotation.

By causing driving device 20 to rotate in different directions of rotation, guide screw 14 may therefore be caused to assume different positions within a regulating range 22 of mechanical adjusting device 11. From a fixed point in transmission housing 24 of the mechanical adjusting device, control equipment 23 monitors a gear teeth passage in terms of number and direction of movement. Gear teeth passage refers to the passage of gear teeth that can be observed when viewing the periphery of one of the rotating transmission wheels. The fully mechanical transmission of movements in adjusting device 11 ensures that the gear teeth passage always reflects the actual instantaneous position on guide screw 14 and hence the position within the regulating range 22 of the mechanical adjusting device. It is also possible to allow transmission 19 to incorporate a toothed belt or chain transmission instead of a gear transmission. The procedure will be largely the same as for the gear transmission.

Control equipment 23 may be electronic and in its simplest design can convert read parameters to information on the set vibration amplitude of the drum. This information can be transmitted to the roller driver, who could then alter the setting, also via the control equipment. In a more advanced design, the control equipment can detect when there are unfavorable packing conditions and with automatic equipment switch to a more suitable vibration amplitude. Regardless of design, control equipment 23 influences the rotation and direction of rotation of driving device 20 of adjusting device 11. Adjusting device 11 is designed so that freestanding drive shaft 3 of eccentric shaft 2 is able to run through its center. This is achieved by designing tube sleeve 17 with an inner clearance for freestanding drive shaft 3.

Figure 3:
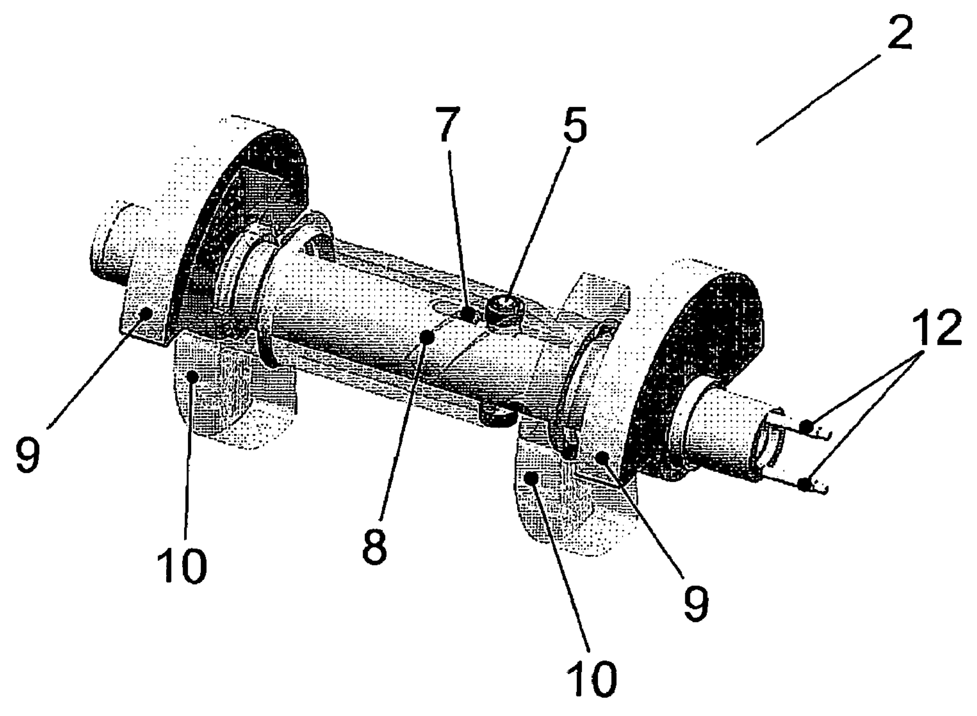
FIG. 3 shows a perspective view of selected parts of FIG. 1.

FIG. 3 shows eccentric shaft 2, turning device 5 and force transmission mechanism 12 from FIG. 1 in a perspective view. FIG. 3 also shows slots 7 and 8 of the inner and outer eccentric shafts, respectively, as well as eccentric weights 9 and 10 of the inner and outer eccentric shafts, respectively. The outer eccentric shaft and its eccentric weight 10 are shown to be transparent in FIG. 3.

Figure 4:
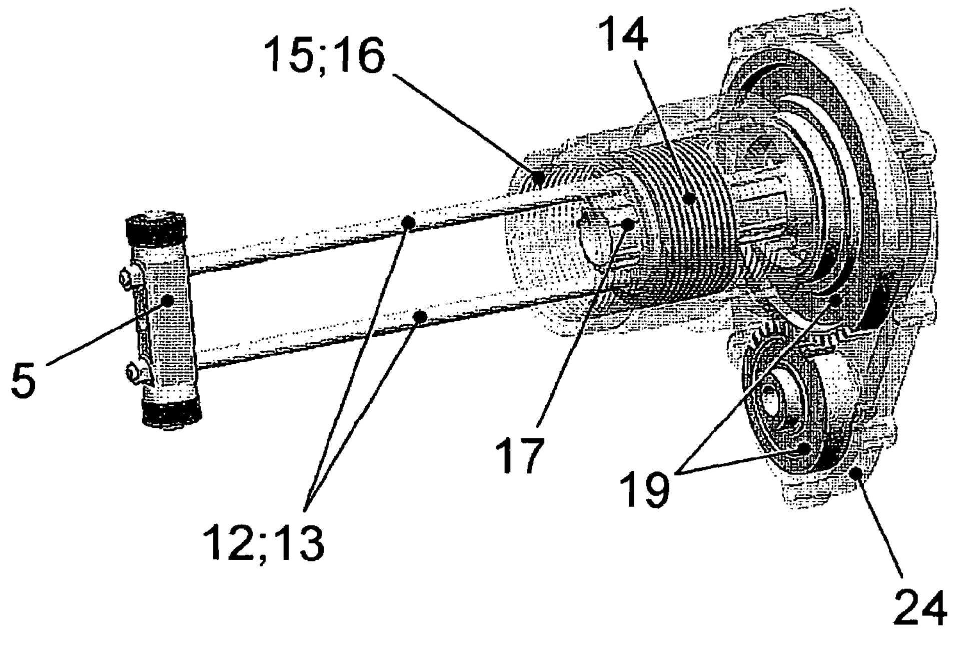
FIG. 4 shows a perspective view of selected parts of FIGS. 1 and 2.

FIG. 4 shows turning device 5, actuating rods 13 of force transmission mechanism 12, guide screw 14, threaded bore 16 within journalling shaft 15 of the roller drum, tube sleeve 17 and transmission 19. Transmission housing 24 is also shown partially and transparently. The gear distribution on the circumference of the gear wheels in transmission 19 is only partially represented in FIG. 4. The gear wheels must be provided with an even gear distribution covering the entire circumference of the gear wheels. Journalling shaft 15 is shown transparently in FIG. 4.

It is understood that the foregoing description is that of the preferred embodiments of the invention and that various changes and modifications may be made thereto without departing from the spirit and scope of the invention as defined in the appended claims.

What is claimed is:

1. An apparatus for adjusting the vibratory amplitude of a roller drum, the apparatus comprising:

an eccentric shaft defining a longitudinal axis and being rotatably journalled in said drum;

an adjusting device for regulating the eccentric movement of said eccentric shaft;

a turning device operatively connected to said eccentric shaft for imparting a rotation thereto;

a force transmission mechanism connecting said turning device to said adjusting device and for transmitting an axially directed force from said adjusting device to said turning device to effect a rotation of said eccentric shaft;

said adjusting device including a guide screw;

a bearing assembly for connecting said force transmission mechanism to said guide screw so as to permit said force transmission mechanism to follow the rotation of said eccentric shaft relative to said adjusting device while at the same time transmitting force to said turning device in either direction along said longitudinal axis;

said adjusting device further including a journalling shaft defining a threaded bore for threadably engaging said guide screw;

a tube sleeve extending into said guide screw so as to define an interface therewith;

a spline connection at said interface for connecting said tube sleeve to said guide screw so as to permit a rotary movement of said guide screw while at the same time allowing displacement thereof along said longitudinal axis; and, said adjusting device further including a driving device and a transmission interposed between said driving device and said tube sleeve for transmitting a rotary movement to said tube sleeve from said driving device.

2. The apparatus of claim 1, wherein said transmission incorporates a gear transmission.

3. The apparatus of claim 1, wherein said adjusting device has a regulating range; and, said apparatus further comprises a control unit for detecting and controlling the position within said regulating range.

4. The apparatus of claim 3, said control unit including means for monitoring a gear teeth passage in terms of number and direction of movement.

5. The apparatus of claim 1, wherein said force transmission mechanism comprises at least two actuating rods.

6. The apparatus of claim 1, further comprising a freestanding drive shaft running through the center of said adjusting device.

7. The apparatus of claim 1, wherein an adjusting motor and a drive motor are arranged in parallel.

* * * * *